(12) United States Patent
Patton

(10) Patent No.: US 9,645,869 B2
(45) Date of Patent: May 9, 2017

(54) USING EXCEPTION INFORMATION

(75) Inventor: Gordon Patton, Dundee (GB)

(73) Assignee: NCR Corporation, Duluth, GA (US)

( * ) Notice: Subject to any disclaimer, the term of this patent is extended or adjusted under 35 U.S.C. 154(b) by 507 days.

(21) Appl. No.: 12/958,001

(22) Filed: Dec. 1, 2010

(65) Prior Publication Data
US 2012/0144371 A1 Jun. 7, 2012

(51) Int. Cl.
G06F 9/44 (2006.01)
G06F 11/07 (2006.01)

(52) U.S. Cl.
CPC ...... G06F 11/0706 (2013.01); G06F 11/0766 (2013.01); *G06F 8/75* (2013.01); *G06F 11/0769* (2013.01)

(58) Field of Classification Search
CPC .............................. G06F 8/443; G06F 11/0715
USPC ........... 717/120, 123–131, 139, 4, 141, 136; 714/38, 46, 2; 709/224; 726/27
See application file for complete search history.

(56) References Cited

U.S. PATENT DOCUMENTS

| | | | | |
|---|---|---|---|---|
| 5,410,648 A * | 4/1995 | Pazel | ........................ | G06F 8/10 700/87 |
| 5,860,008 A * | 1/1999 | Bradley | ..................... | G06F 8/53 717/137 |
| 6,151,701 A * | 11/2000 | Humphreys et al. | ......... | 717/130 |
| 6,158,045 A * | 12/2000 | You | ................................. | 717/124 |
| 6,282,698 B1 * | 8/2001 | Baker et al. | ................... | 717/118 |
| 7,003,762 B2 * | 2/2006 | Krueger | ................ | G06F 9/4812 712/233 |
| 7,086,046 B2 * | 8/2006 | Barsness | .................. | G06F 8/443 717/109 |
| 7,216,336 B1 * | 5/2007 | Ezra et al. | ..................... | 717/124 |
| 7,533,365 B1 * | 5/2009 | Hogstrom | ................. | G06F 8/10 717/104 |
| 7,908,521 B2 * | 3/2011 | Sridharan et al. | ........... | 714/47.1 |
| 8,079,019 B2 * | 12/2011 | Lindo | ................. | G06F 11/0778 711/132 |
| 8,176,475 B2 * | 5/2012 | Kosche et al. | ................ | 717/127 |
| 2001/0047510 A1 * | 11/2001 | Angel et al. | ...................... | 717/4 |
| 2002/0023257 A1 * | 2/2002 | Charisius | .................. | G06F 8/20 717/106 |
| 2003/0051073 A1 * | 3/2003 | Mishra et al. | ................ | 709/332 |

(Continued)

OTHER PUBLICATIONS

Attardi, Giuseppe et al. "CodeBricks: Code Fragments as Building Blocks", Jun. 7, 2003, ACM.*

(Continued)

Primary Examiner — Lewis A Bullock, Jr.
Assistant Examiner — Gilles Kepnang
(74) Attorney, Agent, or Firm — Schwegman, Lundberg & Woessner

(57) ABSTRACT

A method of using exception information for binary code. The method comprises: receiving exception information relating to an exception occurring during execution of binary code, the exception information including a code reference identifying a function executing while the exception occurred, and a line number for that function. The method also comprises: accessing intermediate code using the code reference and the line number to obtain intermediate code fragments; converting the intermediate code fragments to a source code approximation; and providing the source code approximation and function name to a log for subsequent analysis.

6 Claims, 2 Drawing Sheets

(56) References Cited

U.S. PATENT DOCUMENTS

| | | | |
|---|---|---|---|
| 2003/0051233 A1* | 3/2003 | Krishna | G06F 8/30 717/136 |
| 2003/0101438 A1* | 5/2003 | Mishra et al. | 717/136 |
| 2004/0083464 A1* | 4/2004 | Cwalina | G06F 11/3608 717/141 |
| 2004/0250175 A1* | 12/2004 | Draine et al. | 714/46 |
| 2004/0268309 A1* | 12/2004 | Grover | G06F 8/20 717/120 |
| 2006/0053307 A1* | 3/2006 | Xu | G06F 21/14 713/190 |
| 2006/0112373 A1* | 5/2006 | Rokosz | 717/125 |
| 2006/0143597 A1* | 6/2006 | Alaluf et al. | 717/136 |
| 2006/0200806 A1* | 9/2006 | Tasinga | 717/128 |
| 2007/0168949 A1* | 7/2007 | Shattuck et al. | 717/115 |
| 2007/0261124 A1* | 11/2007 | Centonze et al. | 726/27 |
| 2008/0072102 A1* | 3/2008 | Elliott et al. | 714/38 |
| 2009/0013208 A1* | 1/2009 | DiMuzio | 714/2 |
| 2009/0019273 A1* | 1/2009 | French | G06F 9/3861 712/244 |
| 2009/0228869 A1* | 9/2009 | McKinsey | G06F 8/443 717/123 |
| 2009/0320129 A1* | 12/2009 | Pan | G06F 21/54 726/22 |
| 2009/0328001 A1* | 12/2009 | Dubinets et al. | 717/120 |
| 2010/0218169 A1* | 8/2010 | Andersen et al. | 717/125 |
| 2010/0287541 A1* | 11/2010 | Saunders et al. | 717/139 |
| 2011/0258609 A1* | 10/2011 | Maczuba | 717/128 |
| 2012/0066378 A1* | 3/2012 | Lui et al. | 709/224 |

OTHER PUBLICATIONS

Dawson, Dylan et al. "Monitoring in Adaptive Systems using Reflection", May 12, 2008, ACM.*

Cabral, Bruno, et al. "Hidden truth behind. NET's exception handling today." 2007. IET software 1.6: pp. 233-250.*

Emmerik, M. V.et al. "Using a decompiler for real-world source recovery." 2004. Reverse Engineering. 11th Working Conference on. IEEE.*

Miecznikowski, Jerome et al. "Decompiling Java using staged encapsulation." 2001. Reverse Engineering. Proceedings. Eighth Working Conference on. IEEE.*

* cited by examiner

USING EXCEPTION INFORMATION

FIELD OF INVENTION

The present invention relates to improvements in or relating to using exception information.

BACKGROUND OF INVENTION

It is not uncommon for exceptions to occur in binary code (also referred to as executable code). An exception has been defined as an event that occurs during execution of a program that disrupts the normal flow of instructions during the execution of that program.

These exceptions are handled by the operating system, which typically captures the location (or the function) in the binary code at which the exception occurs, together with some additional details about the exception that occurred, for example, the stack trace, register values, the name of the application or object that caused the error, and the like. The operating system then searches through the list of methods that have already been called (the call stack) to search for a routine that can handle the exception. This routine is referred to as the exception handler. If no exception handler is found, then the operating system (if configured to do so) may launch a debugging application and provide the exception to that debugging application. Regardless of whether a debugging application is launched, the operating system will typically log the exception to an event log.

Binary code is typically generated from source code (which is compiled to create the binary code). During this compilation process, useful information is lost. This lost information includes, for example, the names of the functions in the source code, the location of these functions in memory, the types of parameters expected by each function, global and local variable names, source code line information (which allows each command in binary code to be mapped back to one or more lines of source code associated with that command), and the like.

Some programming environments (such as the Microsoft (trade mark) .NET framework, and Java (trade mark)) create intermediate code that is compiled at runtime to create binary code. For such programming environments, significantly more information is available to the target computer system executing the code at runtime than just the binary code. The collection of files that contain the intermediate code is typically referred to as an assembly.

It remains, however, a difficult and time-consuming task to trace an exception to the original source code, even using these additional files. It would be better if this process could be improved.

SUMMARY OF INVENTION

Accordingly, the invention generally provides methods, systems, and software for using exception information for binary code to attempt to re-create the source code that caused the exception.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, and other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of using exception information for binary code, the method comprising:

receiving exception information relating to an exception occurring during execution of binary code, the exception information including a code reference identifying a function executing while the exception occurred, and a location for that function;

accessing intermediate code using the code reference and the location to obtain intermediate code fragments;

converting the intermediate code fragments to a source code approximation; and providing the source code approximation and function name to a log for subsequent analysis.

The step of receiving exception information may include receiving a MethodBase object.

The location may comprise a line number.

The step of accessing intermediate code may include accessing an assembly. The assembly may include code implemented according to a NET framework. Alternatively, the assembly may include code implemented according to the Java language.

The step of accessing intermediate code may include using the MethodBase.GetMethodBody method.

The step of converting the intermediate code fragments to a source code approximation may include implementing a process of reflection to retrieve information about the various classes, methods, and properties included in a particular assembly.

The step of converting the intermediate code fragments to a source code approximation may include implementing .NET Reflector (trade mark) software, available from Red Gate of Newnham House, Cambridge Business Park, Cambridge, CB4 0WZ, UK. Any other convenient tool may be used to convert the intermediate code fragments to a source code approximation. For example, suitable tools include: IL disassembler from Microsoft Corporation (trade mark); C#Builder from Borland Corporation (trade mark); Anakrino (from Jay Freeman); DotNet-Reflection-Browser from Lesser-Software (trade mark).

The step of providing the source code approximation and function name to a log for subsequent analysis may include providing the log to a remote system.

The log can be used by a software engineer to ascertain what gave rise to the exception. By using the source code approximation, it is easier to identify the particular function involved.

According to a second aspect there is provided a computer executing: (i) binary code, and (ii) a context provider programmed to:

receive exception information relating to an exception occurring during execution of the binary code;

extract from the exception information (a) a code reference identifying a function executing while the exception occurred, and (b) a location from the binary code corresponding to that function;

access intermediate code using the code reference and the line number to obtain intermediate code fragments;

convert the intermediate code fragments to a source code approximation; and provide the source code approximation and function name to a log for subsequent analysis.

The context provider may include a disassembly tool for converting the intermediate code fragments to a source code approximation.

The context provider may be operable to receive exception information relating to an exception occurring during execution of the binary code from an operating system.

The location from the binary code corresponding to that function may comprise a line number.

According to a third aspect there is provided a method of using exception information for binary code, the method comprising:

receiving exception information relating to an exception occurring during execution of binary code, the exception information including a code reference identifying a function executing while the exception occurred, and a line number for that function;

accessing source code using the code reference and the line number to obtain a source code fragment; and providing the source code fragment and function name to a log for subsequent analysis.

This method may be useful where source code and binary code are both resident on the same computer.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
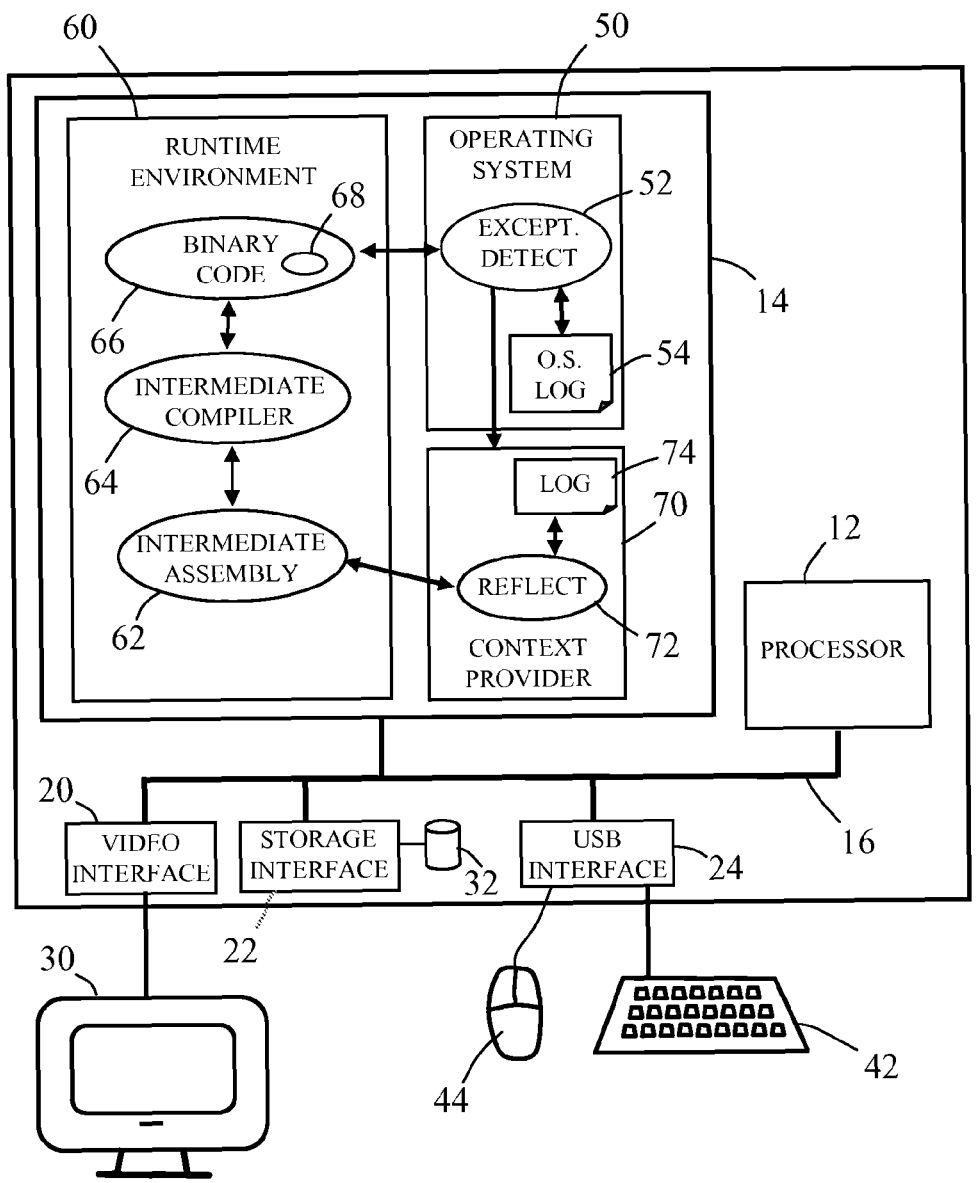
FIG. 1 is a simplified block diagram illustrating a computer executing software components according to one embodiment of the present invention.

Reference is first made to FIG. 1, which is a simplified block diagram illustrating a computer 10 executing software components according to one embodiment of the present invention.

The hardware in the computer 10 is conventional, so will only be described briefly herein.

The computer 10 comprises a processor 12 coupled to volatile memory (RAM) 14 by a system bus 16. The processor 12 is also coupled, inter alia, to a video interface 20, a non-volatile storage interface 22, and a USB interface 24.

The video interface 20 is coupled to a display 30 for outputting information to a user. The non-volatile storage interface 22 is coupled to a disk drive 32 for permanent storage of data and instructions, and also to removable media players (not illustrated, but including a compact disc player and/or a digital versatile disc player). The USB interface 24 is coupled to a keyboard 40, a mouse 42, and any other desired hardware input devices (such as a writing tablet).

The software components executing in the memory 14 will now be described.

The memory 14 includes a conventional operating system kernel 50. In this embodiment, the operating system 50 comprises the Windows XP (trade mark) operating system, available from Microsoft Corporation (trade mark).

In addition to the many standard components included in the operating system (not shown for clarity) there is a conventional Windows exception detection component 52. The exception detection component 52 stores exception information to an operating system event log 54.

The memory 14 also includes a runtime environment 60. In this embodiment the runtime environment 60 implements the .NET framework. The runtime environment 60 includes an intermediate code assembly 62 (compiled from source code), a just-in-time compiler 64 for compiling and optimizing the intermediate code to create native code (binary code) 66. During operation, if an exception occurs while the binary code 66 is executing, the binary code 66 creates an exception object 68.

The memory 14 also includes a context provider 70. The context provider 70 includes a reflector component 72 and a code fragment log 74, which is populated by the reflector component 72. In this embodiment, the reflector component is based on a program called .NET Reflector (trade mark), and is available from Red Gate of Newnham House, Cambridge Business Park, Cambridge, CB4 0WZ, UK.

Figure 2:
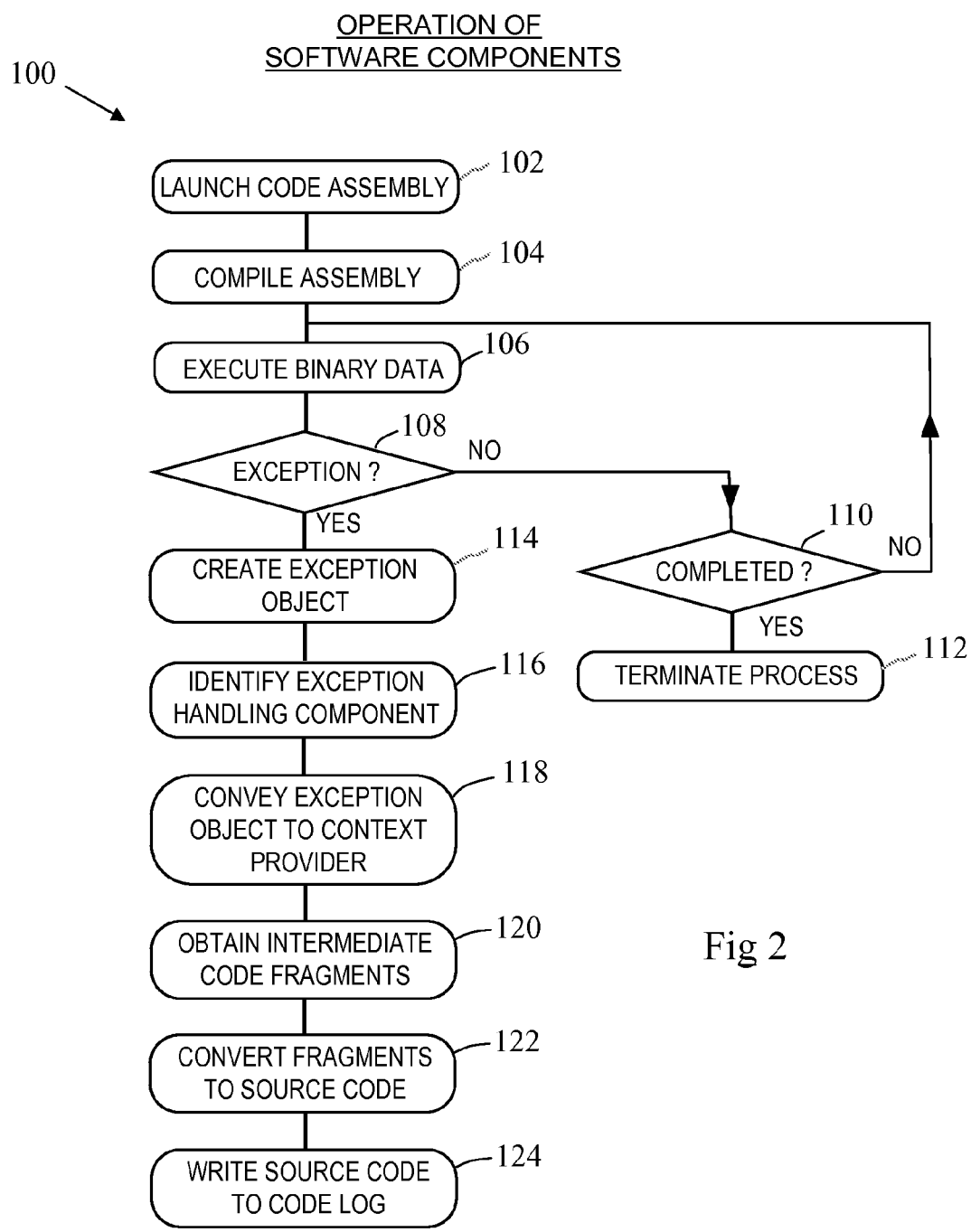
FIG. 2 is a flowchart illustrating steps performed by the software components of FIG. 1.

The operation of the computer 10 will now be described with reference to FIG. 2, which is a flowchart illustrating the steps performed by the software components 50,60,70 in the computer 10 to implement an improved exception handling process 100.

Initially, the user launches the intermediate code assembly 62 (step 102). This causes the just-in-time compiler 64 to compile the assembly 62 (step 104) to create binary code (native executable code), and then the runtime environment 60 executes the binary code (step 106).

In the same way as for conventional programs, the operating system 50 monitors for any exceptions that occur (step 108). If there is no exception, and the binary code 66 is still executing (step 110) then the binary code 66 continues to execute as normal. If the binary code 66 has completed, then the process 100 terminates (step 112)

If an exception occurs during execution, then the binary code 66 creates an object (the exception object 68) (step 114) that contains information about the exception.

In this embodiment, the .NET framework is used, and the exception object 68 includes a MethodBase object that exposes relevant information about the exception that was thrown. This information about the exception includes: a message that describes the current exception; a link to any help file associated with this exception; the exception instance that caused the exception; the name of the application or object in the binary code 66 that caused the exception; the method that threw the current exception (which is a code reference identifying a function executing in the binary code 66 while the exception occurred); and a string representation of the frames on the call stack at the time the exception was thrown. The frames on the call stack can be used to identify a line number for the function executing in the binary code 66 while the exception occurred.

The exception detection component 52 is notified of the exception object 68 and examines the call stack in a conventional manner to ascertain which component will handle the exception (step 116).

In this embodiment, the context provider 70 performs exception handling (or at least a portion of exception handling). The exception detection component 52 conveys the exception object 68 to the context provider 70 (step 118).

The context provider 70 uses the code reference and the line number from the exception object 68 to access the intermediate code assembly 62 to obtain intermediate code fragments (step 120). In this embodiment, this is implemented by the context provider 70 calling the method MethodBase.GetMethodBody, which retrieves the intermediate code fragments.

The context provider 70 passes the intermediate code fragments to the reflector component 72, which converts these intermediate code fragments to source code (step 122). This source code may not be identical to the original source code that was used to create the intermediate code assembly 62, but it is an approximation to that original source code. Hence, it is referred to herein as source code approximation.

The reflector component 72 then writes the source code approximation, exception type, and function name to the code fragment log 74 (step 124). The reflector component 72 may also write additional information, if desired. This information may include, for example, date, time, DLLs that are loaded, stack trace information, computer name or IP address, or the like.

The code fragment log 74 may be transferred (on request, or periodically) to a remote system. A software engineer (or a tester or support person) can then examine the code fragment log 74 (at the remote system) to review the exception type and source code approximation for analysis.

If the software engineer has access to the original source code, then the source code approximation may be useful to help the engineer locate the relevant function. However, the source code approximation may be sufficient for the engineer's purposes, thereby saving the engineer the time that would have been spent in looking up the original source code.

It should now be appreciated that where an intermediate language is used, an approximation to the source code can be provided together with an exception to give a software engineer (or an automated system) more information about the origin of the exception and the source code that may have given rise to the exception.

Various modifications may be made to the above described embodiment within the scope of the invention, for example, in other embodiments, if the target computer (that is, the computer that is executing the binary code) has access to the original source code, then the context provider 70 may use the details from the exception object 68 to access the original source code directly. This has the advantage that the source code fragment produced is the actual source code, not an approximation to the source code. In such an embodiment, the runtime environment 60 may not require intermediate code (intermediate between source code and binary code) since the original source code is present.

In other embodiments, the runtime environment 60 may implement a Java (trade mark) framework.

In other embodiments, the exception object 68 may include different (or additional) information to that described above.

In other embodiments, a different reflector component 72 may be used to access the intermediate code assembly 62 and approximate source code therefrom.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A method of using exception information for binary code, the method comprising:
   compiling an original source code into an intermediate code assembly;
   generating binary code from the intermediate code assembly;
   executing the binary code;
   monitoring, by the operating system, the execution of the binary code;
   when an exception has occurred, creating, by the binary code, an exception object containing information related to the exception, the information including a code reference identifying a function name and a string representation of a call stack at the time the exception was thrown, wherein a frame of the call stack identifies a line number for a function;
   notifying an exception detection component of the exception object;
   upon notification of the exception object, examining, by the exception detection component, the call stack frame to determine which component will handle the exception;
   sending the exception object to a context provider;
   accessing, by the context provider, the intermediate code assembly to retrieve intermediate code fragments based on the function name and the line number associated with the exception object;
   passing the retrieved intermediate code fragments to a reflector component;
   converting the intermediate code fragments, by the reflector component, to a source code approximation of the original source code, the source code approximation being in a source code format different from the original source code;
   writing, by the reflector component, the source code approximation, an exception type for the exception, an Internet Protocol (IP) address for a computer executing the binary code, stack trace information for the stack, a date and a time when the exception was raised, and function names associated with the line numbers of the exception object to a code fragment log for subsequent analysis;
   transferring the code fragment log to a remote system; and
   performing, by a software engineer at the remote system, subsequent analysis using the source code approximation to locate the actual source code associated with the intermediate code fragments.

2. A method according to claim 1, wherein accessing further includes accessing an assembly including code implemented according to a ".NET" framework.

3. A method according to claim 1, wherein converting further includes implementing a process of reflection to retrieve information about various classes, methods, and properties included in a particular assembly.

4. A method according to claim 1, wherein the code fragment log can be used by a software engineer to ascertain what gave rise to the exception.

5. A computer executing:
(i) binary code programed to:
   execute after being generated from an intermediate code assembly, the intermediate code assembly being a compiled version of an original source code, and
   when an exception has occurred, create an exception object containing information related to the exception, the information including a code reference identifying a function name and a string representation of a call stack at the time the exception was thrown, wherein a frame of the call stack identifies a line number for a function;
(ii) an operating system programmed to:
   monitor the execution of the binary code; and
   provide notification about the exception object to an exception detection component;
(iii) the exception detection component programmed to:
   upon notification of the exception object, examine the call stack frame to determine which component will handle the exception;
   sending the exception object to a context provider;
(iv) the context provider programmed to:
   access the intermediate code assembly to retrieve intermediate code fragments based on the function name and the line number associated with the exception object;
   pass the retrieved intermediate code fragments to a reflector component;
(v) the reflector component programmed to:
   convert the intermediate code fragments to a source code approximation of the original source code, the source code approximation being in a source code format different from the original source code;
   write the source code approximation, an exception type for the exception, an Internet Protocol (IP) address for the computer, stack trace information for the stack, a date and a time when the exception was raised, and function name associated with the line numbers of the exception object to a code fragment log for subsequent analysis;
(vi) further instructions programmed to:
   transfer the code fragment loci to a remote system; and
   perform, by a software engineer at the remote system, subsequent analysis using the source code approximation to locate the actual source code associated with the intermediate code fragments.

6. A computer system comprising a computer according to claim 5, and the remote system coupled to the computer.

* * * * *